(12) United States Patent
Kouznetsov et al.

(10) Patent No.: US 8,926,939 B2
(45) Date of Patent: Jan. 6, 2015

(54) NEOPOLYOLS SUITABLE FOR CRYSTAL GROWTH MODIFICATION IN THE BAYER PROCESS

(71) Applicant: Ecolab USA Inc., St. Paul, MN (US)

(72) Inventors: Dmitri L. Kouznetsov, Aurora, IL (US); Jianjun Liu, Aurora, IL (US); David H. Slinkman, Collegeville, PA (US)

(73) Assignee: Ecolab USA Inc., Naperville, IL (US)

( * ) Notice: Subject to any disclaimer, the term of this patent is extended or adjusted under 35 U.S.C. 154(b) by 0 days.

(21) Appl. No.: 13/798,392

(22) Filed: Mar. 13, 2013

(65) Prior Publication Data

US 2014/0271416 A1    Sep. 18, 2014

(51) Int. Cl.
*C02F 1/00*     (2006.01)
*C22B 21/00*   (2006.01)

(52) U.S. Cl.
CPC ................................. *C22B 21/0015* (2013.01)
USPC ............ 423/625; 423/122; 423/127; 423/629

(58) Field of Classification Search
None
See application file for complete search history.

(56) References Cited

U.S. PATENT DOCUMENTS

| | | |
|---|---|---|
| 2,181,695 A | 11/1939 | Given |
| 2,184,703 A | 12/1939 | Spangenberg |
| 2,257,347 A | 9/1941 | Raymer |
| 3,642,437 A | 2/1972 | Marquis |
| 3,770,808 A | 11/1973 | Marquis |
| 4,159,255 A | 6/1979 | Gainer et al. |
| 4,256,709 A | 3/1981 | Sizyakov |
| 4,267,064 A | 5/1981 | Sasaki et al. |
| 4,512,959 A | 4/1985 | Pohland et al. |
| 5,021,179 A | 6/1991 | Zehler et al. |
| 5,041,269 A | 8/1991 | Moody et al. |
| 5,275,628 A | 1/1994 | Dimas et al. |
| 5,290,465 A | 3/1994 | Sabahi |
| 6,168,767 B1 | 1/2001 | Welton et al. |
| 7,771,681 B2 | 8/2010 | Kouznetsov et al. |
| 7,976,820 B2 * | 7/2011 | Liu et al. ................... 423/629 |
| 7,976,821 B2 | 7/2011 | Liu et al. |
| 2007/0172405 A1 | 7/2007 | Liu et al. |
| 2008/0107578 A1 | 5/2008 | Wang et al. |
| 2008/0159934 A1 | 7/2008 | Kouznetsov et al. |

FOREIGN PATENT DOCUMENTS

EP     0465055 B1    4/1997

OTHER PUBLICATIONS

International Search Report mailed Jun. 13, 2014 for related PCT application PCT/US2014/015992. (9 Pages).

* cited by examiner

*Primary Examiner* — Steven Bos
(74) *Attorney, Agent, or Firm* — Benjamin E. Carlsen

(57) ABSTRACT

The invention provides methods and compositions for the addition of a CGM to precipitation liquor of a Bayer process. The CGM comprises a neopolyol, an ester derived from a neopolyol, and/or an ether derived from a neopolyol. Optionally the CGM may comprise water and/or an antifoaming agent and/or a hydrocarbon carrier liquid. The CGM is quite effective and results in a significant increase in mean particle size of produced alumina crystals.

12 Claims, No Drawings

NEOPOLYOLS SUITABLE FOR CRYSTAL GROWTH MODIFICATION IN THE BAYER PROCESS

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

The invention relates to compositions, methods, and apparatuses for improving the recovery of valuable aluminum from the aluminum hydroxide production process of a Bayer process. In particular, the invention relates to the compositions and methods providing the increase of particle size of aluminum hydroxide product without a significant decrease in precipitation yield.

As described for example in U.S. Pat. Nos. 7,771,681, 7,976,820, 7,976,821, and US Published Patent Application 2007/0172405, aluminum hydroxide is produced on an industrial scale by well-established methods such as the Bayer process. The Bayer process comprises a digestion stage in which alumina is extracted from bauxite ore, followed by a clarification stage in which red mud is removed, followed by a precipitation process in which aluminum hydroxide crystals are grown followed by a classification stage in which crystal seeds are separated from product material and followed by a calcination stage in which the aluminum end product is produced.

As described in European Patent Specification EP 0465055B1, in the precipitation process, seed material is added to liquor pregnant with alumina. The seeds function as surface sites which aid in the nucleation and growth of alumina bearing crystals of a particular distribution of specific sizes. In particular some crystals are targeted to having a size optimized to facilitate easy and efficient separation from the liquor and further processing. Other crystals are targeted to having a size optimized for functioning as future seeds.

The precipitation process operators optimize their methods so as to produce the greatest possible yield from the aluminate process liquors while trying to achieve a given crystal size distribution of aluminum hydroxide product. It is desirable in most instances to obtain the product of relatively large crystal size since this is beneficial in subsequent processing steps required to produce aluminum metal. Production is often limited by processing conditions under which the crystallization and precipitation is conducted. These processing conditions vary from one plant to the next and include, but are not limited to, temperature profiles, seed charge, seed crystal surface area, purge of carbon dioxide or flue gases, liquor loading, liquor purity, and the like.

The art described in this section is not intended to constitute an admission that any patent, publication or other information referred to herein is "prior art" with respect to this invention, unless specifically designated as such. In addition, this section should not be construed to mean that a search has been made or that no other pertinent information as defined in 37 CFR §1.56(a) exists.

BRIEF SUMMARY OF THE INVENTION

To satisfy the long-felt but unsolved needs identified above, at least one embodiment of the invention is directed towards a method of recovering alumina from a precipitation liquor comprising. The method comprises (i) adding to the precipitation liquor a crystal growth modifying composition, the composition comprised of one item selected from the list consisting of a neopolyol, an ester derived from a neopolyol, an ether derived from a neopolyol, and any combination thereof, ii) distributing the crystal growth modifying composition through the precipitation liquor; and (iii) precipitating crystal agglomerates from the liquor.

The neopolyols may be selected from the list consisting of neopentyl glycol of formula $HOCH_2-C(CH_3)_2-CH_2-OH$, the trimethylolpropane of formula $HOCH_2-C(C_2H_5)(CH_2-OH)_2$, the pentaerythritol of formula $HOCH_2-C(CH_2OH)_2-CH_2-OH$, dimethylpropane-1,3-diol, 2,2-dimethylheptanediol, 2,2-dimethyloctanediol, 2,2-dimethyl-1,3-propanediol, dipentaerythritol, tripentaerythritol, di-trimethylolpropane, 2,2,4-trimethyl-1,3-pentanediol, 2-butyl-2-ethyl-1,3-propanediol, 3-hydroxy-2,2-dimethylpropyl 3-hydroxy-2,2-dimethyl propanate, and any one dimers thereof, and any one trimer thereof, and any one ether thereof, and any on ester thereof, and any combination thereof.

The ether may be the reaction product of alkoxylation of polyalkylene glycol pentaerythritol ethers with from 1 to 450 oxyalkylenated units. The ether may be a reaction product of alkoxylation of polypropylene glycol pentaerythritol ether comprising from 1 to 450 propylene oxide units. The ester may be a reaction product of a neopolyol with a C8-C24 fatty acid. The composition may be a reaction product of a neopolyol with myristic, lauric, stearic, palmitic acids, oleic, linoleic, linolenic, alpha-eleostearic, licanic, docosahexenoic, arachidic acids, and any combination thereof. The ester may have been completely or only partially esterified. The ester may be prepared from soybean oil or corn oil fatty acids with the ratio of fatty acids to pentaerythritol in the range from 2.5 to 1 and from 3.5 to 1. The crystal growth modifying composition may further include a hydrocarbon carrier liquid. The crystal growth modifying composition may be added to the precipitation liquor in an amount sufficient to cause a change in the particle size of the precipitating crystals. The crystal growth modifier may be applied to a precipitation liquor of a Bayer process. The composition may be distributed within the precipitation liquor by the means of conventional, high shear, or ultrasonic mixing. The composition may be added through mixing into a precipitation liquor in at least one location of said method for recovering alumina, wherein said location is selected from at least one of the following: a) a precipitation feed liquor, b) a seed slurry, and c) directly into a precipitation tank.

Additional features and advantages are described herein, and will be apparent from, the following Detailed Description.

DETAILED DESCRIPTION OF THE INVENTION

The following definitions are provided to determine how terms used in this application, and in particular how the claims, are to be construed. The organization of the definitions is for convenience only and is not intended to limit any of the definitions to any particular category.

"BET" means the Brunauer-Emmett-Teller method for experimental determination of surface area. The method employs the analysis of adsorption isotherm of nitrogen or other gases on the material.

"CGM" means crystal growth modifier.

"Consisting Essentially of" means that the methods and compositions may include additional steps, components, ingredients or the like, but only if the additional steps, components, components and/or ingredients do not materially alter the basic and novel characteristics of the claimed methods and compositions.

"Comminuted" means powdered, pulverized, ground, or otherwise rendered into fine solid particles.

"Effective amount" means a dosage of any additive that affords an increase in one of the three quantiles when compared to an undosed control sample.

"Hydrocarbon carrier" means a hydrophobic liquid that can comprise or be comprised of aliphatic or aromatic compounds such as paraffinic oils, naphthenic oils, or fuel oils as well as bottoms or residual waste materials remaining from the production of aliphatic alcohols, the constituents of carriers can be used neat or as a mixture of any proportion but must have a boiling point safely above the temperature of the hot aluminate liquor undergoing precipitation (about 80° C.).

"Hydrocyclone" means a device to classify, separate or sort particles in a liquid suspension based on the ratio of their centripetal force to fluid resistance, in particular for dense and coarse particles, and low for light and fine particles, they often have a cylindrical section at the top where liquid is being fed tangentially and a conical base, and they often have two exits on the axis: the smaller on the bottom (for underflow) and a larger one at the top (for overflow), generally the underflow is the denser or coarser fraction, while the overflow is the lighter or finer fraction.

"Liquor" or "Bayer liquor" means a caustic, liquid medium that has run through at least a portion of a Bayer process in an industrial facility.

"Precipitation liquor" means aluminate containing liquor in an aluminum hydroxide precipitation step of an alumina production process. The aluminate liquor may be referred to as various terms known to those of ordinary skill in the art, for example, pregnant liquor, green liquor, and aluminum hydroxide precipitation feed. The Bayer process is one example of an alumina production process. The term precipitation liquor may also include the aluminate solution directed to decomposition in a sintering-carbonation process or combined Bayer-sintering process as accomplished by the methods well known to those skilled in the art as described, for example, in U.S. Pat. Nos. 4,256,709, 3,642,437, 2,184,703, 2,257,347, and 2,181,695.

"Slurry" means a mixture comprising a liquid medium within which fines (which can be liquid and/or finely divided solids) are dispersed or suspended, when slurry is sparged, the tailings remain in the slurry and at least some of the concentrate adheres to the sparge bubbles and rises up out of the slurry into a froth layer above the slurry, the liquid medium may be entirely water, partially water, or may not contain any water at all.

"SEM" means scanning electron microscope.

"Surfactant" is a broad term which includes anionic, nonionic, cationic, and zwitterionic surfactants. Enabling descriptions of surfactants are stated in *Kirk-Othmer, Encyclopedia of Chemical Technology*, Third Edition, volume 8, pages 900-912, and in *McCutcheon's Emulsifiers and Detergents*, both of which are incorporated herein by reference.

"Thickener" or "Settler" means a vessel used to effect a solid-liquid separation of a slurry, often with the addition of flocculants, the vessel constructed and arranged to receive a slurry, retain the slurry for a period of time sufficient to allow solid portions of the slurry to settle downward (underflow) away from a more liquid portion of the slurry (overflow), decant the overflow, and remove the underflow. Thickener underflow and thickener overflow are often passed on to filters to further separate solids from liquids.

"Spent liquor" means liquor resulting from the removal of precipitated aluminum values, such as the spent liquor after the final classification stage that returns back to digestion in the Bayer process.

In the event that the above definitions or a description stated elsewhere in this application is inconsistent with a meaning (explicit or implicit) which is commonly used, in a dictionary, or stated in a source incorporated by reference into this application, the application and the claim terms in particular are understood to be construed according to the definition or description in this application, and not according to the common definition, dictionary definition, or the definition that was incorporated by reference. In light of the above, in the event that a term can only be understood if it is construed by a dictionary, if the term is defined by the Kirk-Othmer Encyclopedia of Chemical Technology, 5th Edition, (2005), (Published by Wiley, John & Sons, Inc.) this definition shall control how the term is to be defined in the claims.

At least one embodiment of the invention is directed towards the addition of a CGM to precipitation liquor of a Bayer process. The CGM comprises one item selected from: a neopolyol, a polyester derived from a neopolyol, a polyether derived from a neopolyol, and any combination thereof. Optionally the CGM may comprise water and/or an antifoaming agent and/or a hydrocarbon carrier liquid.

Suitable neopolyols can be represented by polyols which comprise a carbon atom, at the alpha position of one of the alcohol functional groups, which is trisubstituted with radicals independently chosen from alkyl, aryl and aralkyl radicals, and combinations thereof. This carbon atom directly linked to 4 other carbon atoms is therefore a "neo" carbon as defined above.

Suitable are neopolyols, dimers or trimers thereof that can be selected but not limited to the group of the neopentyl glycol of formula HOCH2-C(CH3)2-CH2-OH, the trimethylolpropane of formula HOCH2-C(C2H5)(CH2-OH)2, the pentaerythritol of formula HOCH2-C(CH2OH)2-CH2-OH, dimethylpropane-1,3-diol, 2,2-dimethylheptanediol, 2,2-dimethyloctanediol, 2,2-dimethyl-1,3-propanediol, dipentaerythritol, tripentaerythritol, di-trimethylolpropane, 2,2,4-trimethyl-1,3-pentanediol, 2-butyl-2-ethyl-1,3-propanediol, 3-hydroxy-2,2-dimethylpropyl 3-hydroxy-2,2-dimethyl propanate, and mixtures thereof.

The suitable ethers can be prepared by alkoxylation of the above neopolyols. For example, suitable crystal growth modifiers can be prepared using polyalkylene glycol pentaerythritol ethers with from 1 to 450 oxyalkylenated units. In one embodiment of the present invention the suitable material is a polypropylene glycol pentaerythritol ether comprising from 1 to 450 propylene oxide units. In another embodiment of the present invention the suitable polypropylene glycol pentaerythritol ether comprises 18 propylene oxide units.

The suitable esters can be obtained through the reaction of a neopolyol with saturated or unsaturated carboxylic acids. The fatty acids can be straight-chain or branched. The fatty acids may include C8-C24 saturated and unsaturated fatty acids. The former may include myristic, lauric, stearic, palmitic acids and the likes, while the latter may include oleic, linoleic, linolenic, alpha-eleostearic, licanic, docosahexenoic, arachidic acids, and the likes. Any combination of the saturated and unsaturated monobasic acids listed above may be used.

In the suitable esters the neopolyols can be esterified completely or partially. In one embodiment of the present invention the suitable ester is prepared from soybean oil or corn oil fatty acids with the ratio of fatty acids to pentaerythritol in the range from 2.5 to 1 and from 3.5 to 1.

In at least one embodiment the neopolyol or neopolyol derivative is one or more of the compositions of matter described in U.S. Pat. Nos. 5,290,465, 5,021,179, 4,159,255, 4,267,064, and 3,770,808.

In at least one embodiment the CGM comprises a hydrocarbon carrier liquid. Such a carrier liquid is a hydrophobic liquid that can be comprised of the aliphatic or aromatic compounds such as paraffinic oils, naphthenic oils, or fuel oils. Also, bottoms or residual waste materials remaining from the production of alkyl alcohols represent a suitable hydrophobic liquid. The preferred waste material is the C10 alcohol distillation residue having a boiling point of about 250° C. (482° F.). It is light yellow to yellowish brown in color and has a specific gravity of about 0.862, OH— number about 90, SAP No about 50, weight percent acetic about 0.07 and carbonyl about 0.5. Chemically, it is 57-73 weight percent of primary branched chain C10-C22 alcohols (classed as fatty alcohols) and 29-41 weight percent of mixed long chain esters and ethers (C18-C33 ester; C18-C22 ether). The materials suitable as an oil carrier can be used neat or in a mixture of any proportion. The oil carrier needs only be a solvent and have a boiling point safely above the temperature of the hot aluminate liquor undergoing precipitation (about 80° C., 176° F.).

In at least one embodiment the CGM comprises an antifoaming agent. Suitable antifoaming agents include, but are not limited to the compositions named in U.S. Pat. No. 5,275,628 incorporated herein by reference.

In at least one embodiment the CGM is introduced according to one or more of the methods described in U.S. Pat. Nos. 7,771,681, 7,976,820, 7,976,821, and US Published Patent Application 2007/0172405 and may or may not further comprise any one or more of the CGM constituents also described therein.

EXAMPLES

The foregoing may be better understood by reference to the following examples, which are presented for purposes of illustration and are not intended to limit the scope of the invention.

Precipitation Test Procedure:

A number of tests were run using fresh pregnant liquor, obtained from the reconstitution of plant spent liquor. A desired weight of spent liquor was measured into a stainless steel beaker and the volume was reduced by evaporation to about 30%. To this a set weight of aluminum hydroxide solid was added and the mixture stirred until it was dissolved. This solution was removed from the hot plate and placed on a weighing balance and de-ionized water added until a desired weight was attained. The pregnant liquor was filtered to remove any insoluble material.

All precipitation tests were performed in 250-mL Nalgene® bottles rotated end-over-end, at 10 rpm, in an Intronics temperature-controlled water bath. The pregnant liquor having a density of 1.30 kg/L (~72° C.) was placed into the bottles by weight (200 mL=260.0 g), for improved precision. The additive was dosed, with respect to the total surface area of the seed crystals (mg/m2), to the lid of the appropriate bottles using a micro-syringe and the bottles were then placed in the rotating bath for equilibration at 72° C. (20 minutes). After equilibration, the bottles were removed, quickly charged with the required quantity of seed (50 g/L, based on liquor volume) and immediately returned to the water bath. The temperature of the water bath was set to 72° C. The bottles were rotated overnight for 15 hours.

On completion of the 15 hours, the bottles were removed and for each bottle a 20-mL sample of the slurry was filtered through a syringe filter and submitted for liquor analysis. To prevent any further precipitation, 10 mL of a sodium gluconate solution (400 g/L) was added to the remaining slurry and mixed well. The solids were collected by vacuum filtration and were thoroughly washed with hot deionized water and dried at 110° C. The particle size distribution and specific surface area were determined on a Malvern Particle Sizer, which is well known in the art. The particle size distribution is conveniently given by three quantiles, d(0.1), d(0.5) and d(0.9). These represent the diameters under which fall 10%, 50% and 90% of particles by volume, respectively.

Example 1

The tests used the precipitation procedure as described above. The green liquor with A/C ratio=0.66~0.70 was reconstituted from the spent liquor of a North American alumina plant. The precipitation temperature was 72° C., holding time 15 hours, and seed charge 50 g/L. The seed was the C31 alumina trihydrate with BET specific surface area of 0.38 m$^2$/g.

The following CGM composition (Composition 1) was prepared as a 15% solution of an ester of the present invention in 85% paraffinic solvent. The ester was prepared from soybean oil fatty acids with the ratio of fatty acids to pentaerythritol in the range from 2.5 to 1.

Table 1 compares the performance of Composition 1 to the control (no CGM) and the commercial product described below. The CGM products were tested using duplicate runs at the equal dosage of 3 mg/m2 seed surface (60 ppm vs. green liquor).

The commercial product is a crystal growth modifier incorporating fatty acids with chains of greater than ten carbons. The Commercial Product discussed in the Examples is available from Nalco Company, Naperville, Ill. as Nalco Product No. 7837.

TABLE 1

Coarsening Effects of Commercial Product and Composition 1 Compared

| Example | Dose (mg/m$^2$) | Quantile Particle Size, µm | | | % Increase in Mean of Control Quantile Particle Size | | |
| --- | --- | --- | --- | --- | --- | --- | --- |
| | | d(0.1) | d(0.5) | d(0.9) | d(0.1) | d(0.5) | d(0.9) |
| Control 1 | — | 48.2 | 77.6 | 123.5 | | | |
| Control 2 | — | 48.6 | 78.3 | 125.0 | | | |
| Average | — | 48.4 | 78.0 | 124.3 | | | |
| Commercial product | 3 | 53.6 | 86.0 | 136.5 | | | |
| Commercial product | 3 | 52.6 | 84.4 | 134.1 | | | |
| Average | 3 | 53.1 | 85.2 | 135.3 | 4.7 | 7.2 | 11 |

TABLE 1-continued

Coarsening Effects of Commercial Product and Composition 1 Compared

| Example | Dose (mg/m$^2$) | Quantile Particle Size, μm | | | % Increase in Mean of Control Quantile Particle Size | | |
|---|---|---|---|---|---|---|---|
| | | d(0.1) | d(0.5) | d(0.9) | d(0.1) | d(0.5) | d(0.9) |
| Composition 1 | 3 | 57.6 | 92.6 | 147.7 | | | |
| Composition 1 | 3 | 57.0 | 91.8 | 146.7 | | | |
| Average | 3 | 57.3 | 92.2 | 147.2 | 8.9 | 142.2 | 22.9 |

While this invention may be embodied in many different forms, there are described in detail herein specific preferred embodiments of the invention. The present disclosure is an exemplification of the principles of the invention and is not intended to limit the invention to the particular embodiments illustrated. All patents, patent applications, scientific papers, and any other referenced materials mentioned herein are incorporated by reference in their entirety. Furthermore, the invention encompasses any possible combination of some or all of the various embodiments described herein and/or incorporated herein. In addition the invention encompasses any possible combination that also specifically excludes any one or some of the various embodiments described herein and/or incorporated herein.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

All ranges and parameters disclosed herein are understood to encompass any and all subranges subsumed therein, and every number between the endpoints. For example, a stated range of "1 to 10" should be considered to include any and all subranges between (and inclusive of) the minimum value of 1 and the maximum value of 10; that is, all subranges beginning with a minimum value of 1 or more, (e.g. 1 to 6.1), and ending with a maximum value of 10 or less, (e.g. 2.3 to 9.4, 3 to 8, 4 to 7), and finally to each number 1, 2, 3, 4, 5, 6, 7, 8, 9, and 10 contained within the range. All percentages, ratios and proportions herein are by weight unless otherwise specified.

This completes the description of the preferred and alternate embodiments of the invention. Those skilled in the art may recognize other equivalents to the specific embodiment described herein which equivalents are intended to be encompassed by the claims attached hereto.

The invention claimed is:

1. A method of recovering alumina from a precipitation liquor comprising: (i) adding to the precipitation liquor a crystal growth modifying composition, the composition comprising a neopolyol (ii) distributing the crystal growth modifying composition through the precipitation liquor; and (iii) precipitating crystal agglomerates from the liquor.

2. The method of claim 1, wherein the neopolyol is selected from the group consisting of neopentyl glycol of formula HOCH2-C(CH3)2-CH2-OH, trimethylolpropane of formula HOCH2-C(C2H5)(CH2-OH)2, pentaerythritol of formula HOCH2-C(CH2OH)2-CH2-OH, dimethylpropane-1,3-diol, 2,2-dimethylheptanediol, 2,2-dimethyloctanediol, 2,2-dimethyl-1,3-propanediol, dipentaerythritol, tripentaerythritol, di-trimethylolpropane, 2,2,4-trimethyl-1,3-pentanediol, 2-butyl-2-ethyl-1,3-propanediol, 3-hydroxy-2,2-dimethylpropyl 3-hydroxy-2,2-dimethyl propanate, any one dimer thereof, any one trimer thereof, and any combination thereof.

3. The method of claim 1, wherein the composition further comprises a hydrocarbon carrier liquid.

4. The method of claim 3, wherein the composition is added to the precipitation liquor in an amount sufficient to cause a change in the particle size of the precipitating crystals.

5. The method of claim 4 wherein said composition is applied to a precipitation liquor of a Bayer process.

6. The method of claim 4 wherein at least 50 percent of the recovered crystals by weight exceeds 325 mesh.

7. The method of claim 6, wherein the composition is added through mixing into a precipitation liquor in one or any combination of: (i) to a precipitation feed liquor, (ii) to a seed slurry, or (iii) into a precipitation tank.

8. The method of claim 2, wherein the crystal growth modifying composition is distributed within the precipitation liquor by the means of conventional, high shear, or ultrasonic mixing.

9. The method of claim 1, wherein the distributing of the crystal growth modifying composition comprises the addition of an ionic or nonionic surfactant into the crystal growth modifying composition.

10. The method of claim 1, wherein 50 percent to 90 percent of the crystal growth modifying composition has an molecular weight from 500 to about 10,000 Daltons.

11. The method process of claim 10, wherein the remaining amount of crystal growth modifying composition has an average molecular weight within the range of from about 10,000 to about 100,000 Daltons.

12. The method of claim 1, wherein the composition is added through mixing into a precipitation liquor in at least one location of said method for recovering alumina, wherein said location is selected from at least one of the following: a) a precipitation feed liquor, b) a seed slurry, or c) directly into a precipitation tank.

* * * * *